United States Patent [19]

Hirayama et al.

[11] 4,301,048

[45] Nov. 17, 1981

[54] WATER-DISPERSED RESIN COMPOSITION

[75] Inventors: Takao Hirayama; Minoru Fujishima; Hisasi Kaneko; Shigeyoshi Tanaka, all of Hitachi, Japan

[73] Assignee: Hitachi Chemical Company, Ltd., Tokyo, Japan

[21] Appl. No.: 184,378

[22] Filed: Sep. 5, 1980

[30] Foreign Application Priority Data

Sep. 10, 1979 [JP] Japan ............................... 54-116447

[51] Int. Cl.$^3$ ............................................... C08L 67/08
[52] U.S. Cl. ..................... 260/22 CQ; 260/29.2 TN; 260/29.2 E
[58] Field of Search ........... 260/22 CQ, 22 D, 29.2 E, 260/29.2 N, 29.2 TN

[56] References Cited

U.S. PATENT DOCUMENTS

| | | | |
|---|---|---|---|
| 3,406,134 | 10/1968 | Seiwert | 260/22 D |
| 3,544,496 | 12/1970 | Formaini | 260/29.2 E |
| 3,632,837 | 1/1972 | Kolyer | 260/22 CQ |
| 3,660,327 | 5/1972 | Loncrini | 260/22 CQ |
| 4,164,486 | 8/1979 | Kudo | 260/22 D |
| 4,179,420 | 12/1979 | Laganis | 260/29.2 E |

*Primary Examiner*—Paul R. Michl
*Attorney, Agent, or Firm*—Craig and Antonelli

[57] ABSTRACT

A water-dispersed resin composition obtained by dispersing in water a neutralized resin prepared by neutralizing a part or whole of the carboxyl groups in an alkyd resin produced by reacting (A) an oil or fatty acid, (B) tris(2-hydroxyethyl)isocyanurate and/or tris(hydroxymethyl)isocyanurate, (C) a polyhydric alcohol, (D) a monobasic acid, (E) a polybasic acid and (F) polyethylene glycol, wherein individual components (A) to (F) are formulated in terms of the ratio of the number of hydroxyl groups/the number of carboxyl groups in the range of 1.0/1 to 1.6/1 and said alkyd resin has an acid value of 30 or less, is excellent in drying properties and in film properties such as gloss, water resistance, etc.

6 Claims, No Drawings

WATER-DISPERSED RESIN COMPOSITION

This invention relates to a water-dispersed resin composition.

Recently, water-based paints and coatings are noticed from the viewpoint of saving resources and low environmental pollution. Particularly, water-dispersed type paints and coatings have many advantages in that since the amounts of organic solvent, organic amine, etc. used are less than those in water-soluble type paints and coatings, they are preferable from the viewpoint of saving resources and low environmental pollution, since volatilization of the solvent is fast, drying of coated film is fast and a coating procedure is easy, and properties of cured coated film are good in water resistance and corrosion resistance. But since the water-dispersed resin coatings are inferior to organic solvent-based resin coatings widely used at present in evaporation speed of solvent (water in the case of the former), drying properties of coated film of the water-dispersed resin are insufficient.

On one hand, acrylic emulsions are considerably excellent in drying properties of coated film due to hardness of the resin and largeness of the molecular weight, but have many disadvantages in that film forming properties are inferior, gloss of coated film is hardly obtainable, water resistance and corrosion resistance are inferior, and the like.

On the other hand, water-dispersed alkyd resins are good in film forming properties and their cured coated film is excellent in water resistance and corrosion resistance but is insufficient in drying properties of coated film.

In order to solve such problems as mentioned above, there have been made the following three typical proposals: (i) a process for carrying out the reaction by adding a diisocyanate compound to a water-dispered alkyd resin as disclosed in Japanese Patent Appln Kokoku (Post-Exam Publn) No. 29635/73, (ii) a process for polymerizing a vinyl monomer in the presence of a water-dispersible alkyd resin, and (iii) a process of adding a water-soluble vinyl modified alkyd resin to an acrylic emulsion as disclosed in Japanese Patent Appln Kokai (Laid-Open) No. 81344/77. According to these processes, drying properties of coated film become excellent, but there arise many problems in properties of cured coated film in that gloss and water resistance become inferior according to the process (i), water resistance is insufficient according to the process (ii) and gloss and water resistance are insufficient according to the process (iii), and thus these processes are not suitable for producing general-purpose paints and coatings.

It is an object of this invention to solve such problems as mentioned above.

This invention provides a water-dispersed resin composition obtained by dispersing in water a neutralized resin prepared by neutralizing a part or whole of the carboxyl groups in an alkyd resin produced by reacting (A) 0 to 60% by weight of one or more oils or fatty acids, (B) 10 to 60% by weight of tris(2-hydroxyethyl)isocyanurate and/or tris(hydroxymethyl)isocyanurate as a trihydric alcohol, (C) 0 to 50% by weight of one or more polyhydric alcohols having 2 to 6 hydroxyl groups in a molecule except for the component (B), (D) 0 to 20% by weight of one or more monobasic acids having 6 to 18 carbon atoms in a molecule except for the component (A), (E) 10 to 50% by weight of one or more polybasic acids having 4 to 10 carbon atoms in a molecule or acid anhydrides thereof, and (F) 2 to 15% by weight of polyoxyethylene glycol having a molecular weight of 600 to 20,000, wherein individual components (A) to (F) are formulated in terms of the ratio of the number of hydroxyl groups/the number of carboxyl groups in the range of 1.0/1 to 1.6/1, and said alkyd resin has an acid value of 30 or less.

Tris(2-hydroxyethyl)isocyanurate, which is a cyclic trihydric alcohol, can be used as a polyhdric alcohol component in a water-soluble alkyd resin as disclosed in Chem. and Eng. News vol. 42, No. 36, p 101 (1964). But such a water-soluble alkyd resin is not superior to conventional water-soluble alkyd resins in drying properties of coated film and in water resistance and alkali resistance of cured coated film and has not been used as a resin composition having excellent properties as aimed at in this invention. But it is a surprising thing that excellent properties are provided in this invention when tris(2-hydroxyethyl)isocyanurate and/or tris(hydroxymethyl)isocyanurate is used as an alcohol component in a water-dispersed alkyd resin.

As the component (A), there can be used drying oils, semi-drying oils, non-drying oils and fatty acids derived therefrom and synthetic fatty acids. Examples of the component (A) are tung oil, soya oil, linseed oil, castor oil, dehydrated castor oil, safflower seed oil, cotten seed oil, coconut oil, palm oil, and the like; fatty acids derived from these oils; Versatic Acid (tertiary aliphatic monocarboxylic acid, tradename of Shell Chemical Co.), etc. One or more oils and/or oil fatty acids and/or synthetic fatty acids can be used as the component (A) depending on the desired film properties. The component (A) is used in an amount of 0 to 60% by weight. If the component (A) is used in an amount more than 60% by weight, drying properties and hardness of coated film become poor and are insufficient for practical use.

The component (B), tris(2-hydroxyethyl)isocyanurate and/or tris(hydroxymethyl)isocyanurate, is used in an amount of 10 to 60% by weight. If the amount is less than 10% by weight, the drying properties are reduced, while if the amount is more than 60% by weight, gelation easily takes place and unreacted material is resulted. It is preferable to use the component (B) in an amount of 15 to 40% by weight from the viewpoint of improvement in drying properties and gloss of coated film.

As the component (C), there can be used ethylene glycol, propylene glycol, diethylene glycol, neopentyl glycol, 1,4-butanediol, 1,6-hexanediol, cyclohexanedimethylol, trimethylpentanediol, glycerin, dipropylene glycol, trimethylolethane, trimethylolpropane, pentaerythritol, dipentaerythritol and the like, in an amount of 0 to 50% by weight.

As the component (D), there can be used carboxylic acids such as benzoic acid, methylbenzoic acid, p-tert-butylbenzoic acid, isodecane carboxylic acid, cyclohexane carboxylic acid, isooctane carboxylic acid, etc. and ester forming derivatives thereof such as alkyl esters of these acids in an amount of 0 to 20% by weight.

As the component (E), there can be used isophthalic acid, phthalic acid, terephthalic acid, dimethyl terephthalate, tetrahydrophthalic acid, 3,6-endomethylene-$\Delta^4$-tetrahydrophthalic acid, maleic acid, fumaric acid, adipic acid, sebacic acid, dimer acids (dimers of fatty acids), trimellitic acid, Het acid, 1,12-dodecanedioic acid, and acid anhydrides thereof, and ester forming derivatives thereof such as mono- or di-alkyl esters of these acids in an amount of 10 to 50% by weight. These polybasic acids can be selected depending on desired film properties obtained.

As the component (F), there is used polyethylene glycol having a molecular weight of 600 to 20,000. Not only one kind but also two or more kinds having different molecular weights in combination can be used. The amount of the component (F) is 2 to 15% by weight, and the range of 4 to 10% by weight is more preferable in order to give excellent water dispersibility and film properties.

The above-mentioned components (A) to (F) are used so that a total becomes 100% by weight and the ratio of the number of hydroxyl groups to the number of carboxyl groups is 1.0/1 to 1.6/1, preferably 1.0/1 to 1.4/1.

The alkyd resin can be produced by conventional condensation reaction. For example, in the case of using an oil as the component (A), it is preferable to carry out the reaction as follows: in a first step, the component (A), a part or whole of the components (B) and (C), and the component (D) are heated at 170° to 270° C. under nitrogen with stirring to conduct ester interchange or esterification with dehydration and then cooled when an acid value becomes a suitable value, and in a second step, the remainder of the components (B) and (C), the component (E) and the component (F) are added to the reaction solution, heated at 170° to 270° C. under nitrogen with stirring to conduct condensation and cooled when suitable acid value and viscosity are obtained. In the case of using a fatty acid as the component (A) or using no component (A), the components (A) to (F) can be mixed at a time and reacted at 170° to 270° C. under nitrogen with stirring.

The acid value of the resulting alkyd resin is preferably 30 or less in order to maintain good water resistance and alkali resistance of coated film.

It is preferable to add 50 parts by weight or less of water-soluble solvent to 100 parts by weight of the above-mentioned alkyd resin before neutralizing and dispersing the alkyd resin in water from the viewpoint of improving water dispersibility of the alkyd resin. If the amount of the water-soluble solvent is more than 50 parts by weight, the viscosity of water-dispersed solution becomes undesirably too high. As the water-soluble solvents, those having a solubility in water in 5% by weight or more at 20° C. can be used, and in the case of ordinary-temperature-drying type water-dispersed resin composition, those having a boiling point of 200° C. or more are preferable. Examples of the water-soluble solvents are alcohols such as methanol, ethanol, isopropanol, n-propanol, 3-methyl-3-methoxybutanol, n-butanol, isobutanol, sec-butanol, tert-butanol, etc.; ethylene glycol monoalkyl ethers such as ethylene glycol monomethyl ether, ethylene glycol monoethyl ether, ethylene glycol monopropyl ether, ethylene glycol monobutyl ether, etc.; diethylene glycol monoalkyl ethers such as diethylene glycol monomethyl ether, diethylene glycol monoethyl ether, diethylene glycol monopropyl ether, diethylene glycol monobutyl ether, etc.; propylene glycol monoalkyl ethers such as propylene glycol monomethyl ether, propylene glycol monoethyl ether, etc.; dipropylene glycol monoalkyl ethers such as dipropylene glycol monomethyl ether, dipropylene glycol monoethyl ether, etc.; ketones such as acetone, methyl ethyl ketone, etc.; ethers such as tetrahydrofuran, etc.; esters such as methyl acetate, ethyl acetate, ethylene glycol acetate, ethylene glycol diacetate, ethylene glycol monomethyl ether acetate, ethylene glycol monoethyl ether acetate, diethylene glycol monomethyl ether acetate, diethylene glycol monoethyl ether acetate, diethylene glycol monopropyl ether acetate, diethylene glycol monobutyl ether acetate, etc. Among them, methanol, ethanol, propanol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether are preferable.

A part or whole of the carboxyl groups in the above-mentioned alkyd resin in neutralized. It is preferable to neutralize the carboxyl groups so as to become pH 6 or more. As neutralizing agents, there can be used amines such as ammonia, triethylamine, dimethylamino ethanol, morpholine, N-methylmorpholine, 2-amino-2-methylpropanol, etc.; hydroxides of alkali metals such as sodium hydroxide, potassium hydroxide, etc.; carbonates of alkali metals such as sodium carbonate, etc.; bicarbonates of alkali metals such as sodium bicarbonate, etc.; ammonium carbonate, etc.

The desired water-dispersed resin composition can easily be prepared by mixing the thus obtained neutralized resin with water with stirring, wherein the amount of water is 20 to 80% by weight, preferably 40 to 60% by weight based on the weight of the composition.

The water-dispersed resin composition of this invention can be used as it is, but it may contain, if desired, one or more pigments, plasticizers, solvents, colorants, and the like additives, or one or more water-soluble or water-dispersible resins such as modified amino resins obtained by reacting melamine, urea, benzoguanamine or the like with formaldehyde and etherifying the reaction product with a monohydric alcohol such as methanol, ethanol, butanol, or the like (said modified amino resin being used in an amount of about 10 to 30% by weight based on the weight of the alkyd resin), epoxy resins, alkyd resins, polyester resins, acrylic resins, and the like, alone or a mixture thereof. For example, by a combination with a modified amino resin and an epoxy resin, there can be provided a baking paint. Particularly, in the case of using a drying oil or its fatty acid as the component (A) in the water-dispersed resin composition, when a metal salt of aliphatic carboxylic acid such as Co, Mn, Pb, Zn or the like salt of naphthenate or octoate is used as a metal dryer in an amount of about 0.001 to 0.5% by weight based on the weight of the alkyd resin, excellent properties as ordinary-temperature-drying type paint can be exhibited. By adding one or more pigments, surface treating agents, organic solvents and the like conventionally used to the water-dispersed resin composition of this invention, coating compositions or paints can be obtained. Such coating compositions can be coated by using a conventional method such as dip coating, brushing, spray coating, roller coating, or the like on a substrate such as surfaces of wood, paper, fibers, plastics, ceramics, iron, non-ferrous metals, or the like.

This invention is illustrated by way of the following Examples, in which all percents are by weight unless otherwise specified.

EXAMPLE 1

In a 1 liter flask made of glass equipped with a stirrer, a thermometer, a reflux dehydration apparatus and an inert gas introducing pipe, 180 g of linseed oil fatty acid, 264 g of tris(2-hydroxyethyl)isocyanurate, 6 g of neopentyl glycol, 72 g of phthalic acid, 80.4 g of isophthalic acid, and 36 g of polyethylene glycol (molecular weight 5000) were placed and condensation was conducted at 185° C. for 1 hour and at 230° C. for additional 3 hours until an acid value of 15 was obtained.

To 100 g of the thus obtained resin, 15 g of diethylene glycol monoethyl ether, 10 g of 3-methyl-3-methoxybutanol, and 1.6 g of triethylamine were added and 124 g of water was added thereto at 60°-70° C. to give a water-dispersed resin composition having a residue on heating of 40% and a viscosity of 100 poises (25° C.).

EXAMPLE 2

In the same apparatus as used in Example 1, 198 g of soya oil fatty acid, 180 g of tris(2-hydroxyethyl)isocyanurate, 51.6 g of trimethylolethane, 9 g of neopentyl glycol, 179.4 g of isophthalic acid, and 30 g of polyethylene glycol (molecular weight 10,000) were placed and condensation was conducted at 185° C. for 1 hour and at 230° C. for additional 3 hours until an acid value of 14 was obtained.

To 100 g of the thus obtained resin, 25 g of 3-methyl-3-methoxybutanol and 1.5 g of triethylamine were added and 124 g of water was added thereto at 50°-60° C. to give a water-dispersed resin composition having a residue on heating of 40% and a viscosity of 60 poises (25° C.).

EXAMPLE 3

In the same apparatus as used in Example 1, 186 g of dehydrated castor oil and 78 g of trimethylolethane were placed and heated at 220° C. for 1 hour and cooled. Subsequently, 90 g of tris(2-hydroxyethyl)isocyanurate, 54 g of cyclohexanedimethylol, 213 g of isophthalic acid, and 42 g of polyethylene glycol (molecular weight 2000) were added to the flask and condensation was further conducted at 230° C. for 3 hours until an acid value of 13 was obtained.

To 100 g of the thus obtained resin, 10 g of butyl Cellosolve and 15 g of 3-methyl-3-methoxybutanol were added followed by an addition of 1.4 g of triethylamine and an addition of 124 g of water at 50°-60° C. to give a water-dispersed resin composition having a residue on heating of 40% and a viscosity of 120 poises (25° C.).

COMPARATIVE EXAMPLE 1

(Use of an alkyd resin outside of this invention)

In the same apparatus as used in Example 1, 210 g of soya oil and 105 g of trimethylolethane were placed and heated at 220° C. for 1 hour and cooled. Subsequently, 51.6 g of pentaerythritol, 224.4 g of phthalic acid, and 36 g of polyethylene glycol (molecular weight 3000) were added to the flask and condensation was conducted at 220° C. for 3.5 hours until an acid value of 15 were obtained.

To 100 g of the thus obtained resin, 20 g of butyl Cellosolve and 1.6 g triethylamine were added and 129 g of water was added thereto at 50°-60° C. to give a water-dispersed resin composition having a residue on heating of 40% and a viscosity of 70 poises (25° C.).

COMPARATIVE EXAMPLE 2

(Use of an isocyanate modified alkyd resin)

To 250 g of the water-dispersed resin composition obtained in Comparative Example 1, 6 g of tolylene diisocyante was added and reacted at room temperature to give a water-dispersed resin composition having a residue on heating of 41.3% and a viscosity of 10 poises (25° C.).

COMPARATIVE EXAMPLE 3

(Use of a vinyl modified alkyd resin)

A: Production of Alkyd Resin

In the same apparatus as used in Example 1, 355.8 g of dehydrated castor oil fatty acid, 127.2 g of trimethylolethane, 62.4 g of phthalic acid and 68 g of polyethylene glycol (molecular weight 3000) were placed and condensation reaction was proceeded at 180° to 220° C. until the acid value became 8. Further, 21 g of maleic acid was added to the flask and the reaction was carried out at 120° C. for 1 hour followed by addition of 300 g of isopropyl Cellosolve to give a solution having a residue on heating of 65.6% and an acid value of 15.

B: Production of Water-Dispersed Vinyl Modified Alkyd Resin Composition

In the same apparatus as used in Example 1, 252 g of the intermediate obtained in above A and 40 g of isopropyl Cellosolve were placed and maintained at 120° C. To this, a mixture of 97.5 g of styrene, 30 g of methyl methacrylate, 6 g of β-hydroxyethyl methacrylate, 1.5 g of methacrylic acid, and 1.2 g of tert-butyl perbenzoate was added dropwise uniformly in 2 hours and the temperature was maintained at 120° C. for additional 2 hours. To 150 g of the thus obtained resin, 2.2 g of triethylamine was added at 98 g of water was added thereto at 50°-60° C. to give a water-based vinyl modified alkyd resin composition having a residue on heating of 40% and a viscosity of 20 poises (25° C.).

COMPARATIVE EXAMPLE 4

(Use of a mixture of an alkyd resin and an acrylic resin)

A: Production of Alkyd Resin

In the same apparatus as used in Example 1, 150 g of soya oil fatty acid, 50 g of dehydrated castor oil fatty acid, 200 g of Epikote 1001 (an epoxy resin, manufactured by Shell Chem. Corp.) and 5 g of fumaric acid were placed and reacted at 200° C. until an acid value of 20 was obtained. After cooling, 280 g of butyl Cellosolve was added to the flask and the temperature was maintained at 100° C. To this, a mixture of 80 g of ethyl methacrylate, 92 g of vinyltoluene, 28 g of methacrylic acid and 8 g of benzoyl peroxide was added dropwise uniformly in 4 hours and the temperature was maintained at that level for additional 4 hours. To the thus obtained resin, 52 g of triethylamine and 276 g of water were added to give a water-soluble resin.

B: Production of Acrylic Resin

In a 300 ml-flask, 90 g of water and 2 g of sodium salt of lauryl sulfate were placed and maintained at 70° C. A mixture of 50 g of styrene, 47 g of ethyl acrylate and 3 g of acrylic acid and a mixture of 0.2 g of ammonium persulfate and 10 g of water were added dropwise to the flask in the presence of an inert gas separately and uniformly in 2 hours and the temperature was maintained at that level for additional 2 hours. Subsequently, 3 g of a 25% ammonia water was added thereto to give an acrylic emulsion.

C: Preparation of Water-Dispersed Resin Mixture

To 100 g of the acrylic emulsion obtained in above B, 38 g of water and 62 g of the water-soluble resin obtained in above A were added gradually with stirring to give a water-dispersed resin mixture having a residue on heating of 40% and a viscosity of 11 poise (25° C.).

COMPARATIVE EXAMPLE 5

(Production of an aqueous alkyd resin solution by using tris(2-hydroxyethyl)isocyanurate)

In the same apparatus as used in Example 1, 198 g of soya oil fatty acid, 180 g of tris(2-hydroxyethyl)isocyanurate, 35.4 g of trimethylolethane, 25.8 g of cyclohexanedimethylol and 171.6 g of isophthalic acid were placed and heated at 185° C. for 1 hour and at 230° C. for 2 hours until an acid value of 22 was obtained. After cooling, 36 g of trimellitic acid was added to the flask and the temperature was maintained at 180° C. to carry out the reaction until an acid value of 50 was obtained. To this, 400 g of butyl Cellosolve, 54 g of triethylamine and 446 g of water were added to give an aqueous alkyd resin solution having a residue on heating of 40%.

Preparation of Paints

The varnishes obtained in Examples 1 to 3 and Comparative Examples 1 to 5 were mixed with the following ingredients to give paints:

| | |
|---|---|
| Titanium white (rutile type) | 50% |
| Butyl Cellosolve | 5% |
| Water-dispersed resin composition or aqueous resin solution | 125% |
| 5% cobalt naphthenate | 0.5% |
| Water | Suitable amount |

Mixtures obtained by the above-mentioned formulations were treated in a sand mill to disperse pigments.

Each paint was diluted with water so that a Ford cup #4 viscosity became 30 to 35 seconds. (Ford cup is a viscometer used for testing paints, varnishes and laquers, and #4 means that a diameter of the small hole at the bottom of the cup is 0.162 inch.)

Test of coated film

Conditions for preparing sample plates:

| | |
|---|---|
| Substrate: | A steel plate bonderized with Bonderite #1077 (an iron phosphate mixture used as a solution for coating steel for protection against corrosion) (Nippon Test Panel Co., 0.5 mm thick) |
| Coating method: | Air spray (Iwata Wider 61, diameter of die 1.5 mm), air pressure 4 kg/cm² |
| Drying: | At 22 to 24° C. for 3 days (except for drying test) |

The test results are as shown in Table 1

TABLE 1

| | Example | | | Comparative Example | | | | |
|---|---|---|---|---|---|---|---|---|
| Example No. | 1 | 2 | 3 | 1 | 2 | 3 | 4 | 5 |
| Film thickness (μm) | 32 | 32 | 33 | 32 | 30 | 34 | 32 | 30 |
| Finger touch drying test (min) | 25 | 27 | 30 | 40 | 40 | 25 | 25 | 90 |
| Cured drying (min) | 90 | 110 | 160 | 480 | 120 | 100 | 90 | 540 |
| Gloss (60°) (%) | 85 | 88 | 88 | 90 | 50 | 70 | 60 | 90 |
| Pencil hardness | F | HB | HB | 2B | 2B | 2B | HB | B |
| After immersion in 5% Na₃PO₄ aqueous solution at 95° C. for 10 min. | Good | Good | Good | Good | Good | Good | Partly dissolved | Completely dissolved |
| Water resistance: immersion in deionized water at 22° C. | | | | | | | | |
| 3 days | Good | Good | Good | Good | Good | Poor | Slightly poor | Poor |
| 7 days | Good | Good | Good | Good | Slightly poor | Poor | Poor | Poor |
| Corrosion resistance: salt spray for 120 hours | | | | | | | | |
| Appearance | Good | Good | Good | Good | Good | Slightly poor | Good | Poor |
| Pelling with tape (breadth, mm) | 8 | 6 | 8 | 8 | 9 | 12 | 12 | 24 |
| Accelerated weathering test: (Sundshine weatherometer) | | | | | | | | |
| Retention of gloss (%) 100 hrs | 85 | 85 | 87 | 83 | 85 | 81 | 75 | 80 |
| 200 hrs | 82 | 81 | 82 | 79 | 82 | 72 | 65 | 75 |
| 300 hrs | 70 | 69 | 71 | 67 | 70 | 60 | 50 | 60 |

Note
(1) Finger tough drying test: A time required for the coating not adhered to a finger when toughed is measured.
(2) Cured drying is evaluated by pressing a coated film with a finger and recording a time at which no fingerprint is marked.
(3) Peeling with tape is conducted as follows: Some cuts are made by a knife on the coated film before the test. After subjected to the salt spray test, the surface of the sample is contacted with a cellophane adhesive tape at the directions of the cuts and then the cellophane adhesive tape is peeled off. Breadth of the coated film peeled off is measured.

As shown in Table 1, the water-dispersed alkyd resins of this invention are superior to the conventional water-dispersed alkyd resin (Comparative Example 1) in drying properties (cured drying properties). As shown in Comparative Examples 2, 3 and 4, the isocyanate modified alkyd resin (Comparative Example 2), the vinyl modified alkyd resin (Comparative Example 3) and a mixture of acrylic emulsion and water-soluble alkyd resin (Comparative Example 4) are good in drying properties, but they are inferior either in gloss, water resistance or alkali resistance. Further, even if the cyclic trihydric alcohol is used in the production of the aqueous alkyd resin solution (Comparative Example 5), the drying properties, water resistance and alkali resistance are remarkably poor. In contrast, the coated films obtained from the water-dispersed alkyd resin compositions of this invention are excellent in film properties as shown in Table 1.

As mentioned above, according to this invention, there is provided water-dispersed resin compositions excellent in drying properties of coated films and excellent in gloss, water resistance, and the like in film properties.

What is claimed is:
1. A water-dispersed resin composition comprising
(i) water and
(ii) a neutralized resin dispersed in water prepared by neutralizing a part or whole of the carboxyl groups in an alkyd resin produced by reacting
   (A) 0 to 60% by weight of one or more oils or fatty acids,
   (B) 10 to 60% by weight of tris(2-hydroxyethyl)isocyanurate and/or tris(hydroxymethyl)isocyanurate as a trihydric alcohol,
   (C) 0 to 50% by weight of one or more polyhydric alcohols having 2 to 6 hydroxyl groups in a molecule except for the component (B),
   (D) 0 to 20% by weight of one or more monobasic acids having 6 to 18 carbon atoms in a molecule except for the component (A),
   (E) 10 to 50% by weight of one or more polybasic acids having 4 to 10 carbon atoms in a molecule or acid anhydrides thereof, and
   (F) 2 to 15% by weight of polyoxyethylene glycol having a molecular weight of 600 to 20,000, wherein individual components are formulated in terms of the ratio of the number of hydroxyl groups/the number of carboxyl groups in the range of 1.0/1 to 1.6/1, and said alkyd resin has an acid value of 30 or less.

2. A water-dispersed resin composition according to claim 1, wherein the ratio of the number of hydroxyl groups/the number of carboxyl groups is 1.0/1 to 1.4/1.

3. A water-dispersed resin composition according to claim 1 or 2, wherein the component (F) is used in an amount of 4 to 10% by weight.

4. A water-dispersed resin composition according to claim 1 or 2, wherein the component (B) is used in an amount of 15 to 40% by weight.

5. A water-dispersed resin composition according to claim 1 or 2, wherein the degree of neutralization of the carboxyl groups in the alkyd resin is pH 6 or more.

6. A water-dispersed resin composition according to claim 1, which further contains 50 parts by weight or less of a water-soluble solvent per 100 parts by weight of the alkyd resin.

* * * * *